(12) United States Patent
Coonjohn

(10) Patent No.: US 7,713,012 B2
(45) Date of Patent: May 11, 2010

(54) LICENSE PLATE FASTENER

(76) Inventor: John Coonjohn, 618 S. New Hampshire, Los Angeles, CA (US) 90005

( * ) Notice: Subject to any disclaimer, the term of this patent is extended or adjusted under 35 U.S.C. 154(b) by 407 days.

(21) Appl. No.: 11/805,316

(22) Filed: May 22, 2007

(65) Prior Publication Data

US 2008/0292428 A1   Nov. 27, 2008

(51) Int. Cl.
F16B 37/14 (2006.01)
(52) U.S. Cl. .................. 411/372.6; 411/377; 411/431
(58) Field of Classification Search ............ 411/372.5, 411/372.6, 373, 377, 431
See application file for complete search history.

(56) References Cited

U.S. PATENT DOCUMENTS

| | | | |
|---|---|---|---|
| 915,068 A * | 3/1909 | Bowen ..................... 411/372 |
| 1,805,937 A | 5/1931 | Berge | |
| 1,938,878 A | 12/1933 | Van Blankensteyn | |
| 2,074,773 A * | 3/1937 | Camp et al. ................. 411/377 |
| 2,103,743 A * | 12/1937 | Doty ........................ 292/327 |
| 2,627,778 A * | 2/1953 | Hodell .................... 411/372.6 |
| 3,930,432 A | 1/1976 | Puchy | |
| 4,136,598 A * | 1/1979 | Hughes ..................... 411/372 |
| 4,601,624 A | 7/1986 | Hill | |
| 4,659,273 A * | 4/1987 | Dudley ..................... 411/373 |
| 4,707,035 A * | 11/1987 | Kondo et al. ........... 301/37.373 |
| 4,890,967 A | 1/1990 | Rosenbaum | |
| 4,962,968 A * | 10/1990 | Caplin .................... 301/108.5 |
| 5,810,532 A * | 9/1998 | Huang ...................... 411/431 |
| 6,029,922 A * | 2/2000 | Kim et al. .................. 242/283 |
| 6,964,549 B2 | 11/2005 | Fallon | |
| 2005/0254920 A1 | 11/2005 | Baughman | |
| 2006/0120825 A1* | 6/2006 | Miyazaki ................. 411/372.6 |
| 2008/0178502 A1* | 7/2008 | Stuchell ...................... 40/200 |

* cited by examiner

Primary Examiner—Flemming Saether

(57) ABSTRACT

A two-piece, decorative fastener assembly for securing a license plate to a vehicle. The decorative fastener uniquely includes a threaded fastener for securing the license plate to the vehicle and a decorative cover that can be quickly and easily connected directly to the head portion of the threaded fastener.

6 Claims, 4 Drawing Sheets

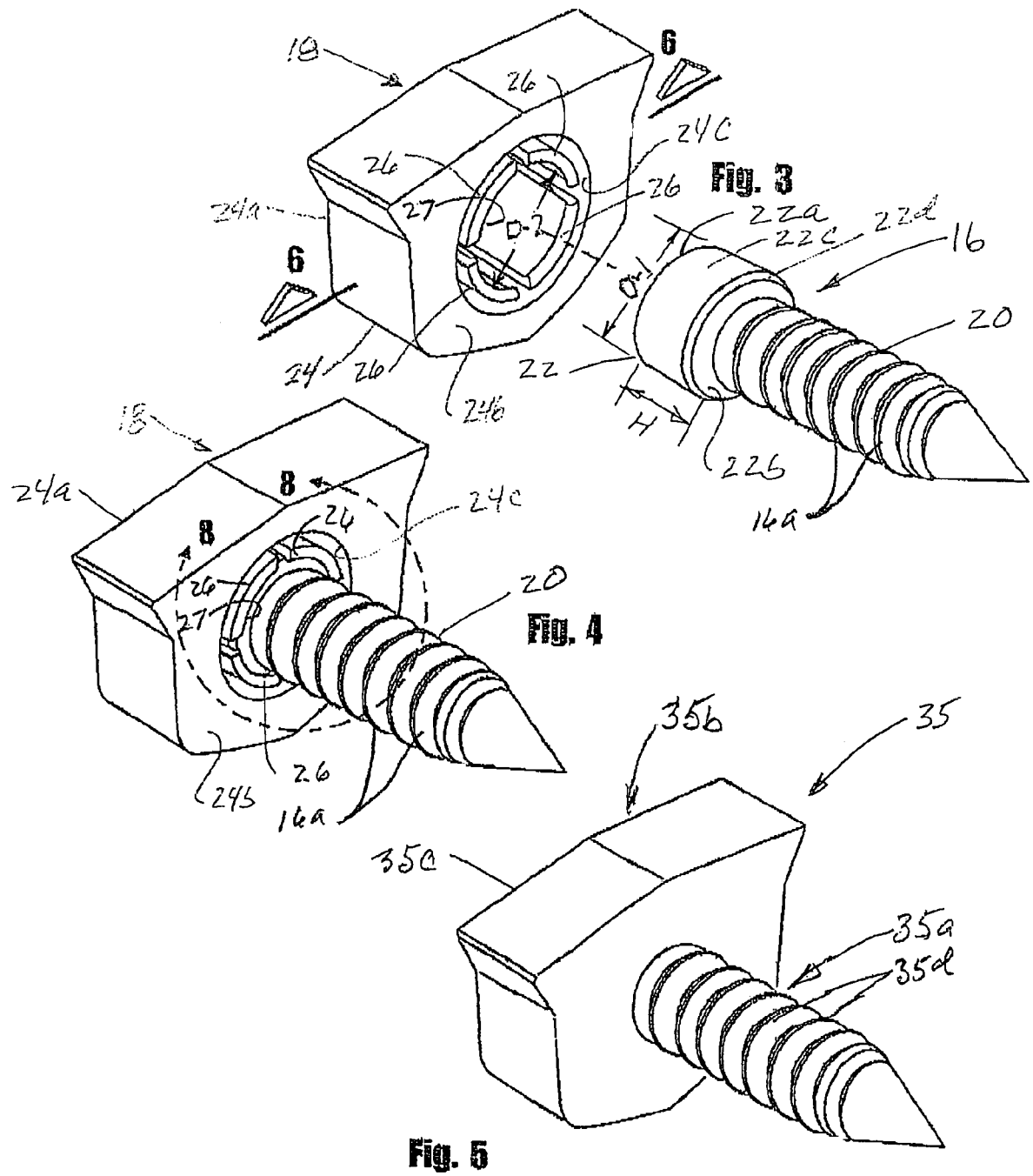

LICENSE PLATE FASTENER

BACKGROUND OF THE INVENTION

1. Field of the Invention

The present invention relates to license plate fasteners. More particularly, the invention concerns license plate fasteners that comprise a threaded fastener for securing the license plate to the vehicle and a decorative cover that is removably connected to the threaded fastener.

2. Discussion of the Prior Art

A number of different types of license plate fasteners have been suggested in the past for interconnecting license plates to the front and rear of vehicles. Exemplary of such license plate fasteners is the fastener disclosed in U.S. Pat. No. 4,890,967 issued to Rosenbaum. The Rosenbaum invention concerns a bolt cap cover that comprises a locking retainer member that fits over the flats of a standard hex-headed bolt and a cap having a generally cylindrical inner surface that fits over the retainer. The retainer is made of a resilient material such as nylon and is designed such that it abuts the lateral flats of the bolt head when the cap is installed. The cap itself may be of various designs and materials, thereby permitting a variety of decorative appearances to be achieved. The cylindrical inner surface of the cap compresses the retainer against the flats of the bolt head as the cap is installed over the retainer, thereby securing both the cap and retainer to the bolt head.

Another type of prior art license plate fastener is disclosed in U.S. Pat. No. 6,964,549 issued to Fallon. The Fallon fastener comprises a generally tubular insert or adaptor made of a resilient material structure like Nylon that includes an annular first end surface surrounded by a peripheral skirt. The annular first end surface is engageable in the manner of a washer by the head of a license plate fastener that is otherwise surrounded by the skirt with the free edge of this skirt provided with an exterior peripheral bead shaped for radial capture in an interior recess formed in a domed, decorative covering cap. A circular seat provided on the domed cap exterior is then useful and conformed to receive one of variously marked plugs to match the logo, style or mark of the vehicle manufacturer or any other style or symbol.

A typical component of the prior art license plate fasteners is some type of retainer member that fits over the head of the fastener used to connect the license plate to the vehicle. The retainer member of the prior art devices constitutes the means by which the decorative cover portion of the device is affixed. In other words, the prior art devices consist of three parts, namely the threaded connector for connecting the license plate to the vehicle, the retainer member that fits over the threaded connector and the decorative head cover that is held in position by the retainer member. In sharp contradistinction, the novel apparatus of the present invention comprises only two components, namely a threaded fastener used to interconnect the license plate to the vehicle and a decorative cover that is removably interconnected directly with the head of the threaded fastener.

SUMMARY OF THE INVENTION

It is an object of the present invention to provide a two-piece, decorative fastener assembly for securing a license plate to a vehicle. The decorative fastener uniquely includes a threaded fastener for securing the license plate to the vehicle and a decorative cover that is connected directly to the head portion of the threaded fastener.

Another object of the invention is to provide a fastener assembly of the aforementioned character which is of a two-piece construction comprising a threaded fastener and a decorative cover that can be quickly and easily connected directly to the head portion of the threaded fastener.

Another object of the invention is to provide a two-piece fastener assembly in which the face of the decorative cover is provided with decorative symbols that match the logo, style or mark of the vehicle manufacturer.

Another object of the invention is to provide a fastener assembly of the character described in which the configuration of the decorative cover is indicative of the logo associated with the vehicle.

Another object of the invention is to provide a fastener assembly as described in the preceding paragraphs in which the decorative cover is provided with a plurality of circumferential spaced-apart, resiliently deformable gripping segments for gripping the head portion of the threaded fastener.

Another object of the invention is to provide a faster assembly of the type described in which the upper surface of the head portion of the threaded fastener is provided with a plurality of circumferentially spaced, radially extending striations for resisting rotation of the decorative cover relative to the threaded fastener.

Another object of the invention is to provide a two-piece fastener assembly for securing a license plate to a vehicle that is of simple design, is highly attractive in appearance, is easy to use and can be manufactured inexpensively in substantial quantities.

By way of summary, these and other objects of the invention are accomplished by a decorative, two-piece fastener assembly for use in mounting a license plate onto a vehicle that includes a threaded fastener for securing the license plate to the vehicle, the threaded fastener including a head portion having a diameter and a threaded shank portion, the head portion having a top wall, a bottom wall and a sidewall interconnecting said top and bottom wall; and a decorative cover connected to the head portion of said threaded fastener, the decorative cover comprising a body portion having a front face, a rear face and a counter-bore having a diameter larger than said diameter of said head portion of the threaded fastener, the body portion further including gripping means disposed within said bore for gripping the head portion of said threaded fastener. In the preferred form of the invention the gripping means comprises a plurality of circumferentially spaced-apart, resiliently deformable gripping segments, each said gripping segment terminating in a gripping protuberance for engagement with a circumferentially extending shoulder provided on the head portion of the threaded fastener.

BRIEF DESCRIPTION OF THE DRAWINGS

FIG. 3 is a generally perspective, exploded, rear view of the form of decorative illustrated in FIG. 1.

FIG. 4 is a generally perspective, rear view, similar to FIG. 3, but showing the threaded fastener component of the decorative fastener interconnected with the head portion thereof.

FIG. 5 is a generally perspective, rear view of an alternate form of the decorative fastener of the invention in which the threaded fastener is integrally formed with the head portion.

DESCRIPTION OF THE INVENTION

Figure 1:
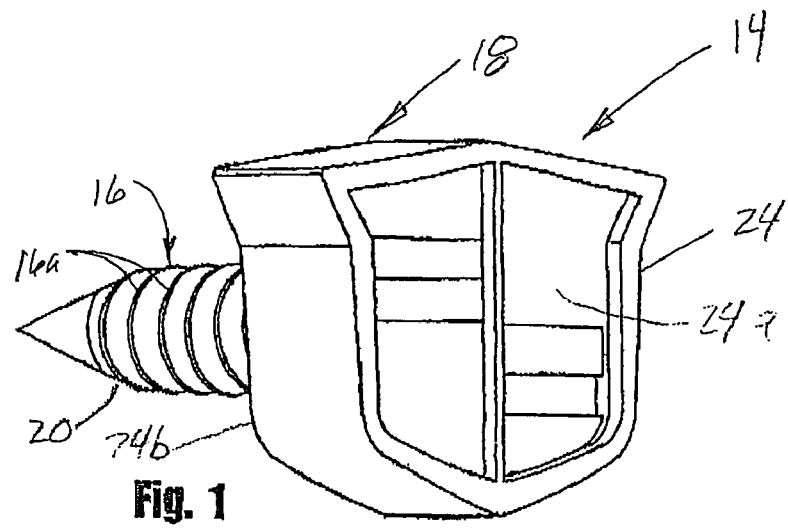
FIG. 1 is a generally perspective, front view of one form of the decorative fastener of the invention for use in mounting a license plate onto a vehicle.
Figure 2:
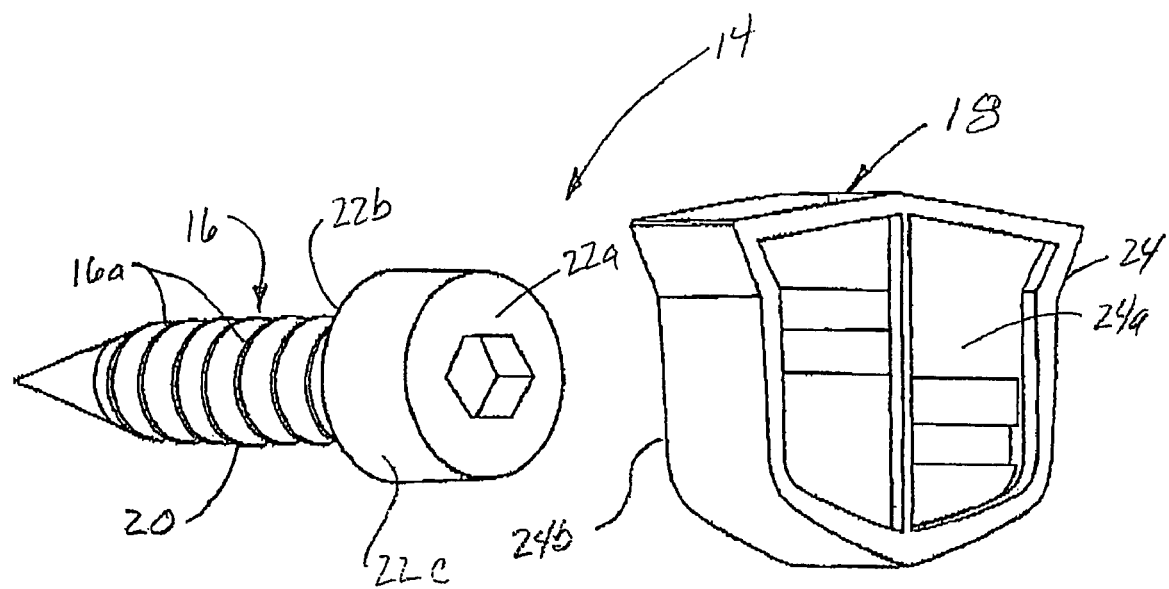
FIG. 2 is a generally perspective, exploded view of the decorative illustrated in FIG. 1.

Referring to the drawings and particularly to FIGS. 1 through 4, one form of the two-piece, decorative fastener of the invention for use in mounting a license plate onto a motor vehicle is there shown and generally designated by the numeral 14. In this form of the invention the fastener assembly comprises a stainless steel threaded fastener 16 for securing the license plate to the vehicle and a decorative cover 18 that can be releasably affixed to the threaded fastener. In this regard, vehicle license plates are typically formed from a thin metal stamping that is provided with fastener openings along the edges thereof. Similarly, the vehicle is provided with a plurality of apertures that are designed to receive threaded fasteners, such as fastener 16, that can be used to attach the license plate to the vehicle.

In the present form of the invention fastener, or screw, 16 has a threaded shank portion 20 and a head portion 22 having a hexagonal wrench-receiving aperture 23, a diameter "D-1" and a height "H" (FIG. 3). As best seen in FIG. 3 of the drawings, head portion 22 also has a top wall 22a, a bottom wall 22b and a tapered sidewall 22c interconnecting the top and bottom wall. As indicated in FIG. 3, tapered sidewall 22c terminates in a circumferentially extending shoulder 22d.

The second component of the two-piece decorative fastener of the invention comprises the previously identified decorative cover 18 that can be releasably connected to head portion 22 of the threaded fastener in the manner illustrated in FIG. 4 of the drawings. Decorative cover 18, which is preferably formed from a moldable plastic such as acrylonitrile butadiene styrene (ABS), comprises a generally shield-shaped body portion 24 having a front face 24a, a rear face 24b and a generally cylindrical, centrally located first cavity 24c. Cover 18 can be formed in various configurations identifiable with the logos of a particular motor vehicle and the front face 24 of the cover can be provided with indicia representative of a particular motor vehicle or representative of the owner of the vehicle.

Figure 6:
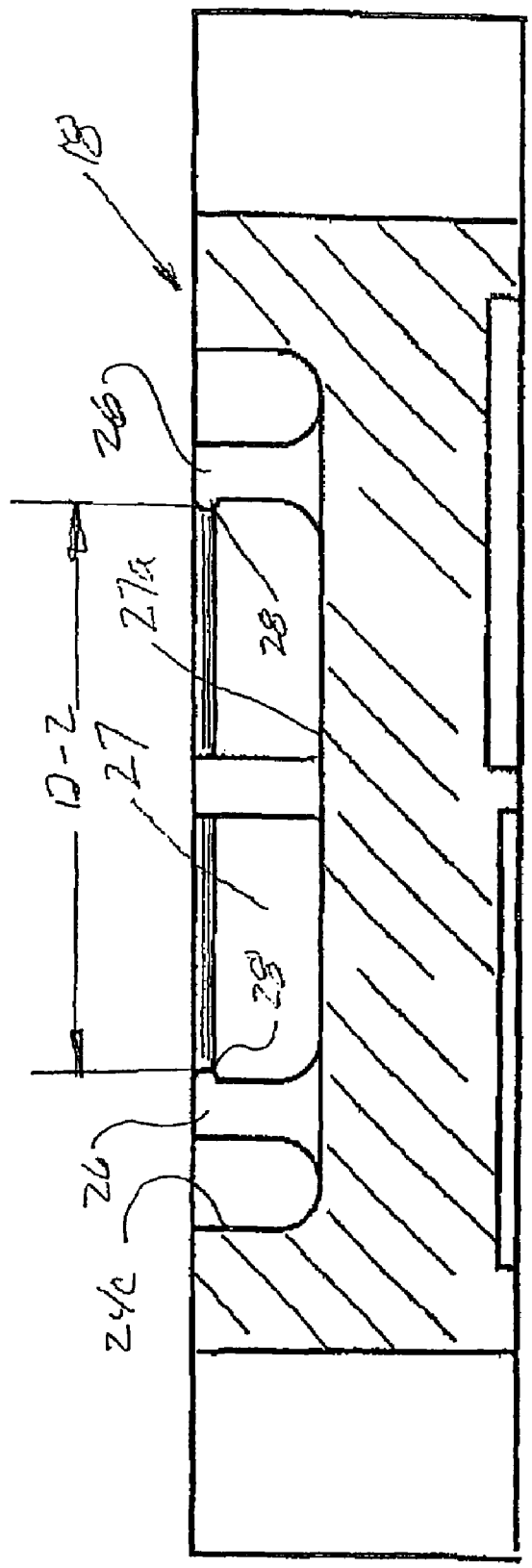
FIG. 6 a greatly enlarged, cross-sectional view taken along lines 6-6 of FIG. 3.
Figure 8:
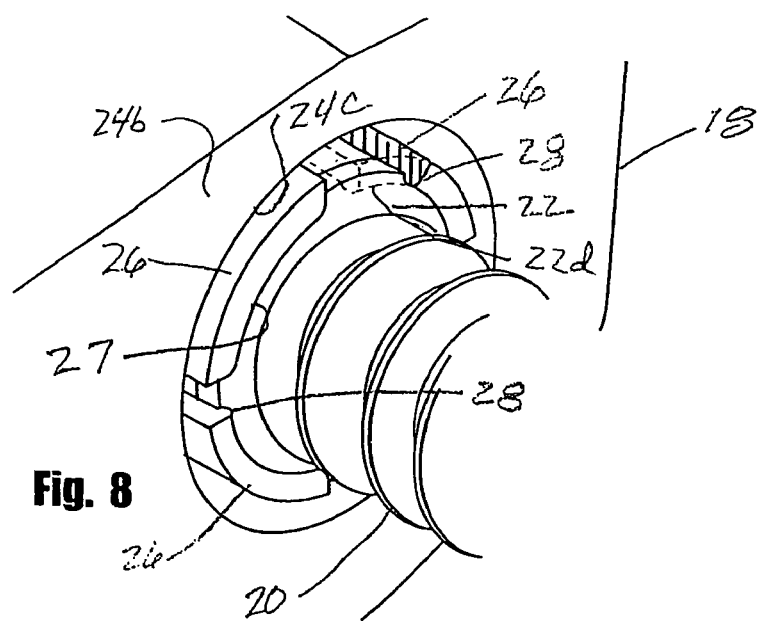
FIG. 8 is a greatly enlarged, generally perspective view of the area designated in FIG. 4 as "8-8".

Disposed within first cavity 24c of the cover 18 are novel gripping means for gripping the head portion 22 of the threaded fastener 20 when the head portion of the fastener is inserted into the cavity 24c in the manner illustrated in FIG. 4 of the drawings. These important gripping means here comprise a plurality of circumferentially spaced-apart, resiliently deformable gripping segments 26 that cooperate to define a tapered second cavity 27. As best seen in FIGS. 6 and 8 of the drawings, each of the gripping segments 26 terminates in a rounded-gripping protuberance 28 for gripping engagement with the circumferentially extending shoulder 22d of the head portion of the fastener 20 when the head portion of the fastener is inserted into second cavity 27 in the manner illustrated in FIG. 8 of the drawings. As indicated in FIGS. 3 and 6 of the drawings, gripping protuberances 28 cooperate to define an opening having a diameter "D-2" that is slightly smaller than the diameter "D-1" of the head portion 22 of the threaded fastener 16.

With the construction described in the preceding paragraphs and as illustrated in the drawings, the threaded fasteners 16 of the invention that are provided with self-tapping threads 16a, can be used in a conventional manner to interconnect a license plate with the particular vehicle the logo of which matches the logo of the decorative cover of the decorative cover. When the license plate is attached to the vehicle, the head portions 22 as well as the circumferentially spaced shoulders 22d of the fasteners 16 are exposed so that the decorative covers can be expeditiously interconnected with the threaded fasteners in the manner next to be described.

Although the diameter "D-2" of the opening defined by the gripping segments 26 is slightly less than the diameter "D-1" of the head portion 22 of the threaded fasteners, because of the resilient nature of the gripping segments 26, a inward force exerted on the head portion 22 of a decorative cover will cause the gripping segments to spread apart a sufficient distance to permit the head portion of the threaded fastener to be received within and seat against the lower surface 27a of the cavity 27. As the head portion 22 of the cover seats against the lower surface of the cavity, the gripping segments 26 will return to their initial configuration and the gripping protuberances 28 will seat against the circumferentially extending shoulder 22d in the manner illustrated in FIG. 8 of the drawings. With the gripping protuberances 28 in engagement with the circumferentially extending shoulders 22d of the head portions of the fasteners 16, the decorative cover will be securely held in position on the threaded fasteners 16. To further secure the cover 18 to the screw head, 22, the taper of the cavity 27 and the taper of the head portion 22 of the screw 16 are strategically sized so that the cover is press-fit over the head portion of the screw.

Figure 7:
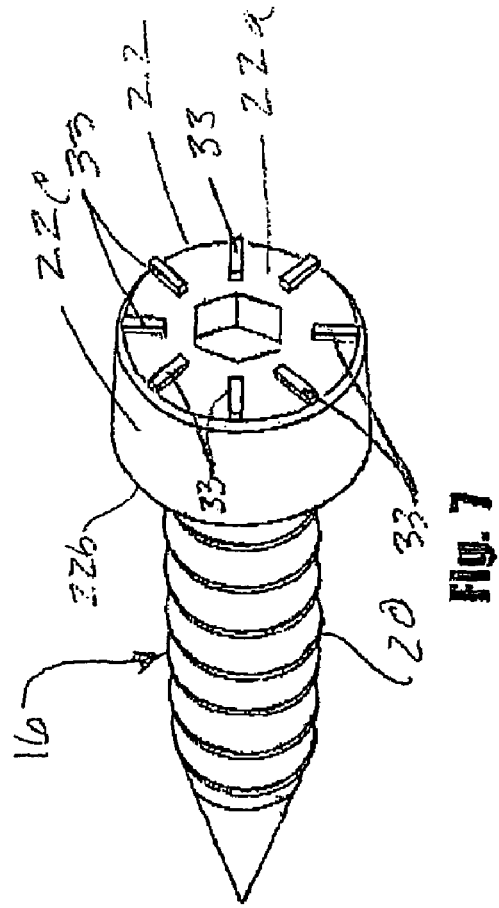
FIG. 7 is a generally perspective, front view of the threaded fastener component of the decorative fastener of the invention.

Turning now to FIG. 7 of the drawings, it is to be noted that in one form of the invention the upper surface 22a of the threaded fastener 16 is provided with a plurality of circumferentially spaced, radially extending protuberances, or striations, 33 that are engageable with the generally planar surface 27a of second cavity 27 when the cover 18 is in position over the head portion of the threaded fastener. These important radially extending protuberances 33 function to grip the generally planar surface 27a of second cavity 27 to resist rotation of the cover relative to the threaded fastener when the cover is in position over the threaded fastener in the manner illustrated in FIG. 1 of the drawings.

Referring next to FIG. 5 of the drawings, another form of the decorative fastener of the invention is there shown and generally designated by the numeral 35. This form of the invention is similar in many respects to that illustrated in FIGS. 1 through 4 of the drawings. However, in this latest form of the invention the decorative fastener 35 is molded in a single piece and comprises a threaded fastener portion 35a, which is of similar construction to threaded fastener 16 and a decorative cover 35b, which is of similar construction to the previously described cover 18. As before, cover 35b, while shown as being generally shield-shaped, can be of various shapes and various types of indicia can be imprinted on the front face 35c of the cover. Fasteners 35, which include self-tapping threads 35d, can be used in the same manner as a conventional threaded screw to interconnect a vehicle license plate to a motor vehicle.

Figure 9:
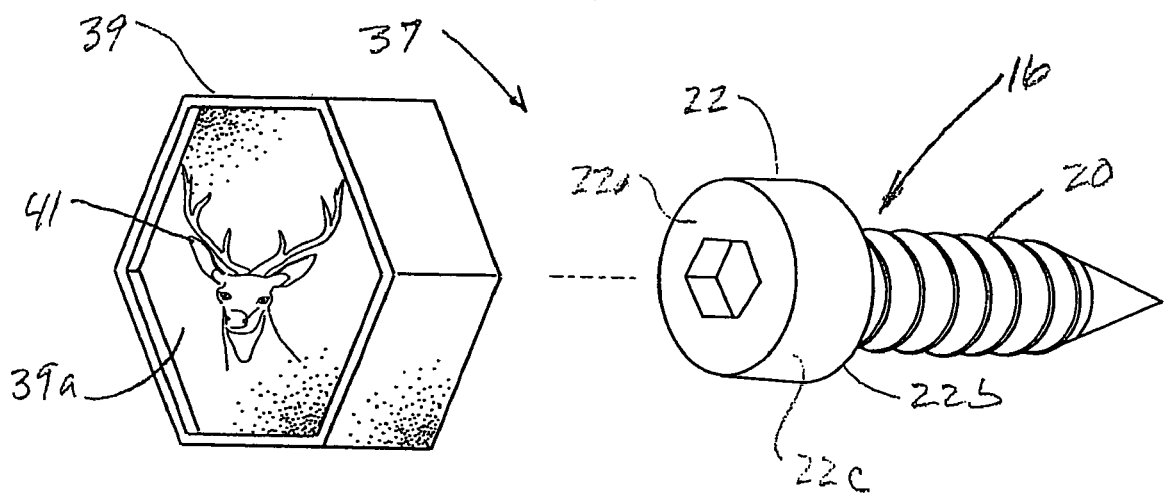
FIG. 9 is an exploded, generally perspective front view of still another form of the decorative fastener of the invention for use in mounting a license plate onto a vehicle.

Referring next to FIG. 9 of the drawings, still another form of the decorative fastener of the invention is there shown and generally designated by the 37. This form of the invention is similar in many respects to that illustrated in FIGS. 1 through 4 of the drawings and like numerals are used in FIG. 9 to identify like components. Like the earlier described fastener of the invention, fastener 37 is of a two-part construction comprising a threaded fastener 16 that is substantially identical in construction and operation to that previously described, and a decorative cover 39 that is substantially identical to the previously described cover 18, save that the configuration of cover 39 is generally hexagonal in shape. Additionally, the upper face 39a of the cover is provided with fanciful indicia 41 that can be representative of the vehicle owner or of the company that owns the vehicle. In this regard, it is to be understood that the cover of the decorative fastener can be of any desired shape and can exhibit various types of indicia has maybe desired by the vehicle owner.

Having now described the invention in detail in accordance with the requirements of the patent statues, those skilled in this art will have no difficulty in making changes and modifications in the individual parts or their relative assembly in order to meet specific requirements or conditions. Such changes and modifications may be made without departing from the scope and spirit of the invention, as set forth in the following claims:

I claim:

1. A decorative fastener for use in mounting a license plate onto a vehicle, comprising:
    (a) a threaded fastener for securing the license plate to the vehicle, said threaded fastener including a head portion having a diameter and a threaded shank portion, said head portion having a top wall, a bottom wall having a circumferentially extending shoulder and a tapered sidewall interconnecting said top and bottom wall, said top wall having a plurality of circumferentially spaced, radially extending protuberances; and
    (b) a decorative cover connected to said head portion of said threaded fastener, said decorative cover comprising a body portion having a front face provided with decorative symbols, a rear face and a first cavity having a diameter larger than said diameter of said head portion of said threaded fastener, said body portion further including gripping means disposed within said first cavity for gripping said head portion of said threaded fastener, said gripping means comprising a plurality of circumferentially spaced-apart, resiliently deformable gripping segments disposed within said first cavity, each said gripping segment terminating in a gripping protuberance for gripping engagement with said circumferentially extending shoulder of said head portion of said threaded fastener, said gripping protuberances cooperating to define an opening having a diameter smaller than the diameter of said head portion of said threaded fastener.

2. The decorative fastener as defined in claim 1 in which said first cavity terminates in a generally planar surface and in which said plurality of circumferentially spaced, radially extending protuberances formed on said top wall of said head portion of said threaded fastener engage said generally planar surface of said first cavity when said decorative cover is affixed to said threaded fastener.

3. The decorative fastener as defined in claim 1 in which said decorative cover is generally shield-shaped.

4. The decorative fastener as defined in claim 1 in which said decorative cover is generally hexagonally shaped.

5. A decorative fastener for use in mounting a license plate onto a vehicle, comprising:
    (a) a threaded fastener for securing the license plate to the vehicle, said threaded fastener including a head portion having a diameter and a threaded shank portion, said head portion having a top wall, a bottom wall having a circumferentially extending shoulder and a sidewall interconnecting said top and bottom wall; and
    (b) a decorative cover connected to said head portion of said threaded fastener, said decorative cover comprising a body portion having a front face, a rear face and a first cavity having a diameter larger than said diameter of said head portion of said threaded fastener, and terminating in a generally planar surface, said head portion of said threaded fastener including a plurality of circumferentially spaced, radially extending protuberances engageable with said generally planar surface of said first cavity when said decorative cover is affixed to said threaded fastener, said body portion of said decorative cover further including gripping means disposed within said first cavity for gripping said head portion of said threaded fastener, said gripping means comprising a plurality of circumferentially spaced-apart, resiliently deformable gripping segments disposed within said first cavity, each said gripping segment terminating in a gripping protuberance for gripping engagement with said circumferentially extending shoulder of said head portion of said threaded fastener.

6. A decorative fastener for use in mounting a license plate onto a vehicle, comprising:
    (a) a threaded fastener for securing the license plate to the vehicle, said threaded fastener including a head portion having a diameter and a threaded shank portion, said head portion having a top wall, a bottom wall having a circumferentially extending shoulder and a tapered sidewall interconnecting said top and bottom wall, said head portion of said threaded fastener including a plurality of circumferentially spaced, radially extending protuberances; and
    (b) a decorative cover connected to said head portion of said threaded fastener, said decorative cover comprising a body portion having a front face provided with decorative symbols, a rear face and a first cavity having a diameter larger than said diameter of said head portion of said threaded fastener and terminating in a generally planar surface, said plurality of circumferentially spaced, radially extending protuberances being engagable with said generally planar surface, said body portion further including gripping means disposed within said first cavity for gripping said head portion of said threaded fastener, said gripping means comprising a plurality of circumferentially spaced-apart, resiliently deformable gripping segments disposed within said first cavity, each said gripping segment terminating in a gripping segment, gripping protuberance for gripping engagement with said circumferentially extending shoulder of said head portion of said threaded fastener, said gripping segment gripping protuberances cooperating to define an opening having a diameter smaller than the diameter of said head portion of said threaded fastener.

* * * * *